(12) United States Patent
Gullin

(10) Patent No.: US 8,645,459 B2
(45) Date of Patent: Feb. 4, 2014

(54) SYSTEM AND METHOD FOR A SERVICE PROVISIONING PLATFORM FOR ACTIVATING SERVICES IN A COMMUNICATION NETWORK

(75) Inventor: Patrick Gullin, Karlskrona (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 650 days.

(21) Appl. No.: 12/621,294

(22) Filed: Nov. 18, 2009

(65) Prior Publication Data

US 2011/0119329 A1 May 19, 2011

(51) Int. Cl.
*G06F 15/16* (2006.01)

(52) U.S. Cl.
USPC ........... 709/203; 709/201; 709/224; 709/229; 705/1; 705/40; 370/352

(58) Field of Classification Search
USPC ................. 709/201–203, 224–229; 370/352; 705/1, 40
See application file for complete search history.

(56) References Cited

U.S. PATENT DOCUMENTS

| | | | | |
|---|---|---|---|---|
| 6,041,124 | A * | 3/2000 | Sugita | 380/270 |
| 7,225,261 | B2 * | 5/2007 | Nishiguchi et al. | 709/227 |
| 7,376,580 | B1 * | 5/2008 | Walker et al. | 705/14.36 |
| 7,853,643 | B1 * | 12/2010 | Martinez et al. | 709/203 |
| 7,860,080 | B2 * | 12/2010 | Yuzhang | 370/352 |
| 8,370,462 | B2 * | 2/2013 | Pelletier et al. | 709/220 |
| 2002/0013827 | A1 | 1/2002 | Edstrom et al. | |
| 2002/0091766 | A1 * | 7/2002 | Shiimori et al. | 709/203 |
| 2002/0188562 | A1 * | 12/2002 | Igarashi et al. | 709/203 |
| 2003/0046411 | A1 * | 3/2003 | Nishiguchi et al. | 709/229 |
| 2003/0061068 | A1 * | 3/2003 | Curtis | 705/1 |
| 2003/0236874 | A1 * | 12/2003 | Hotti | 709/224 |
| 2004/0068565 | A1 * | 4/2004 | Polan et al. | 709/226 |
| 2004/0082346 | A1 * | 4/2004 | Skytt et al. | 455/456.3 |
| 2004/0190704 | A1 * | 9/2004 | Crockett et al. | 709/229 |
| 2004/0261092 | A1 * | 12/2004 | Addington et al. | 709/224 |
| 2005/0228687 | A1 * | 10/2005 | Houtani | 705/1 |
| 2005/0228853 | A1 * | 10/2005 | Yamamura et al. | 709/200 |
| 2006/0015620 | A1 * | 1/2006 | Terada | 709/226 |
| 2006/0035629 | A1 * | 2/2006 | Kodama et al. | 455/415 |
| 2007/0286348 | A1 * | 12/2007 | Kangovi | 379/15.03 |
| 2008/0040510 | A1 | 2/2008 | Warner et al. | |
| 2008/0052719 | A1 | 2/2008 | Briscoe et al. | |
| 2008/0168524 | A1 * | 7/2008 | Wood et al. | 725/134 |

(Continued)

OTHER PUBLICATIONS

"3rd Generation Partnership Project; Technical Specification Group Core Network and Terminals; IP Multimedia (IM) session handling; IM call model; Stage 2 (Release 9)", #GPP TS 23.218, V8.4.0, Dec. 2008; pp. 1-67; XP050363207.

(Continued)

*Primary Examiner* — Wing F Chan
*Assistant Examiner* — Razu Miah
(74) *Attorney, Agent, or Firm* — Myers Bigel Sibley & Sajovec, P.A.

(57) ABSTRACT

A system for provisioning services may include a device that may receive a service order that identifies a service to be provisioned. The device may obtain, using the service order, a specification for the service. The device may further identify, based on the specification, a service processing system to invoke for provisioning the service, and invoke the service processing system by sending the service order and the specification to the identified service processing system.

16 Claims, 6 Drawing Sheets

(56) References Cited

U.S. PATENT DOCUMENTS

| | | | |
|---|---|---|---|
| 2008/0208663 A1* | 8/2008 | Walker et al. | 705/7 |
| 2009/0029692 A1* | 1/2009 | Radermacher et al. | 455/418 |
| 2009/0164642 A1* | 6/2009 | Foti | 709/227 |
| 2010/0161778 A1* | 6/2010 | Guinard et al. | 709/222 |
| 2010/0188990 A1* | 7/2010 | Raleigh | 370/252 |
| 2010/0188992 A1* | 7/2010 | Raleigh | 370/252 |
| 2011/0145408 A1* | 6/2011 | Olsson | 709/225 |

OTHER PUBLICATIONS

European Search Report corresponding to EP 10190463.9 dated Mar. 2, 2011; 9 pages.

Schulke et al. "Creating New Communication Services Efficiently", NEC Journal of Advanced Technology, Graphic Media Business Division, Tokyo, JP, vol. 2, No. 2, Mar. 17, 2005; pp. 170-178, XP002422110.

OASIS Provisioning Services TC, "Advancing Open Standards for the Information Society", http://www.oasis-open.org/committees/tc_home.php?wg_abbrev=provision, printed on Nov. 18, 2009 3 pages.

Information Framework (SID), "Addendum 1R—Common Business Entity Definitions—Root Business Entities", Release 8.0, GB922 Addendum 1R Root, TM Forum Approved Version 2.2, May 2009, 128 pages.

Information Framework (SID), "Service Overview Business Entity Definitions", Release 8.0, GB922—4SO, TM Forum Approved Version 8.0, May 2009, 197 pages.

Telecom Application Map, "The BSS/OSS Systems Landscape", Release 3.1, GB929, TM Forum Approved Version 3.5, Jun. 2009, 225 pages.

"Service Activation—DDP BA—Part 2: Service Activation Interface (SAI)", TMF518_SA_2, Version 1.1, May 2008, 118 pages.

WS>I Web Services Interoperability Organization, "Basic Profile Version 1.1", http://www.ws-i.org/Profiles/BasicProfile-1.1-2006-04-10.html, Apr. 10, 2006, printed on Nov. 18, 2009, 50 pages.

* cited by examiner

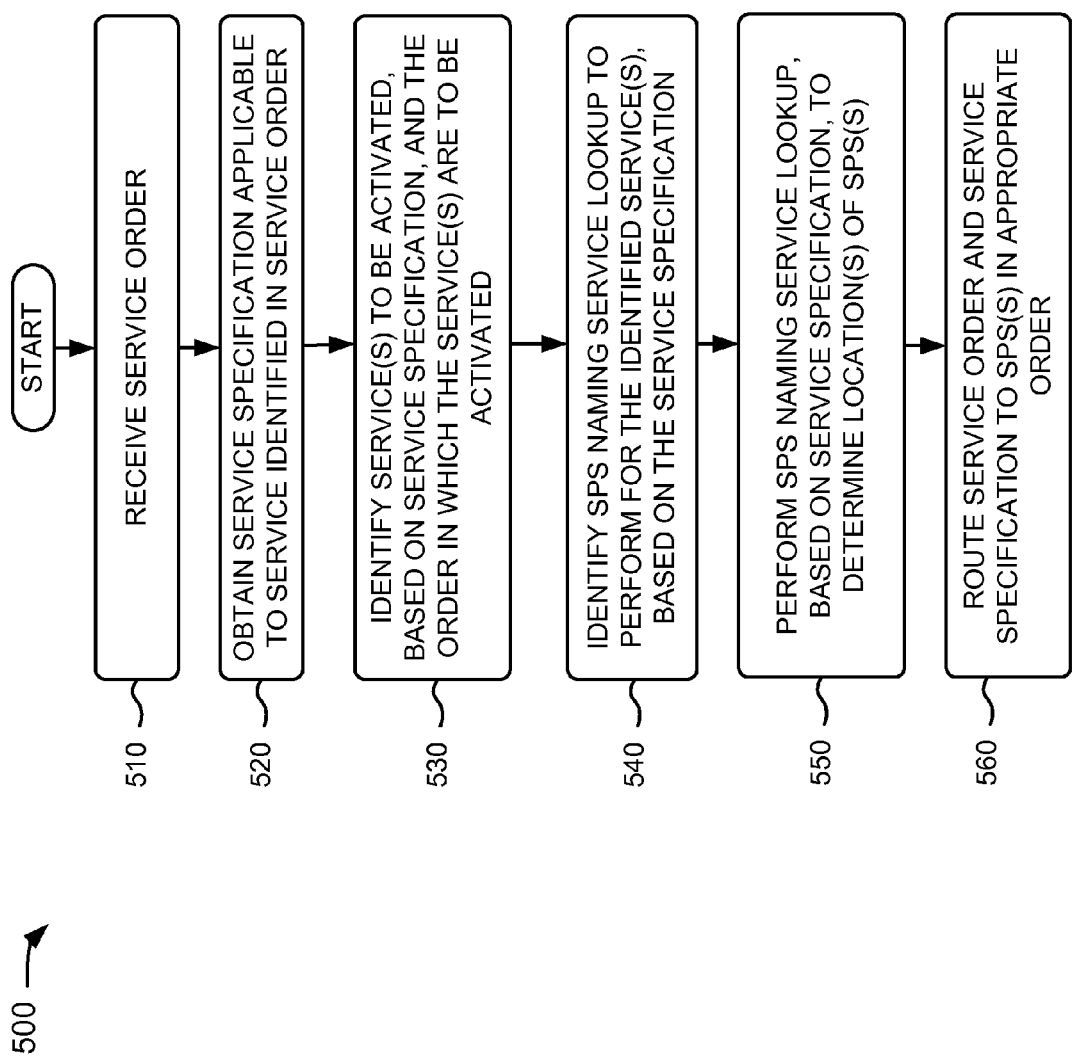

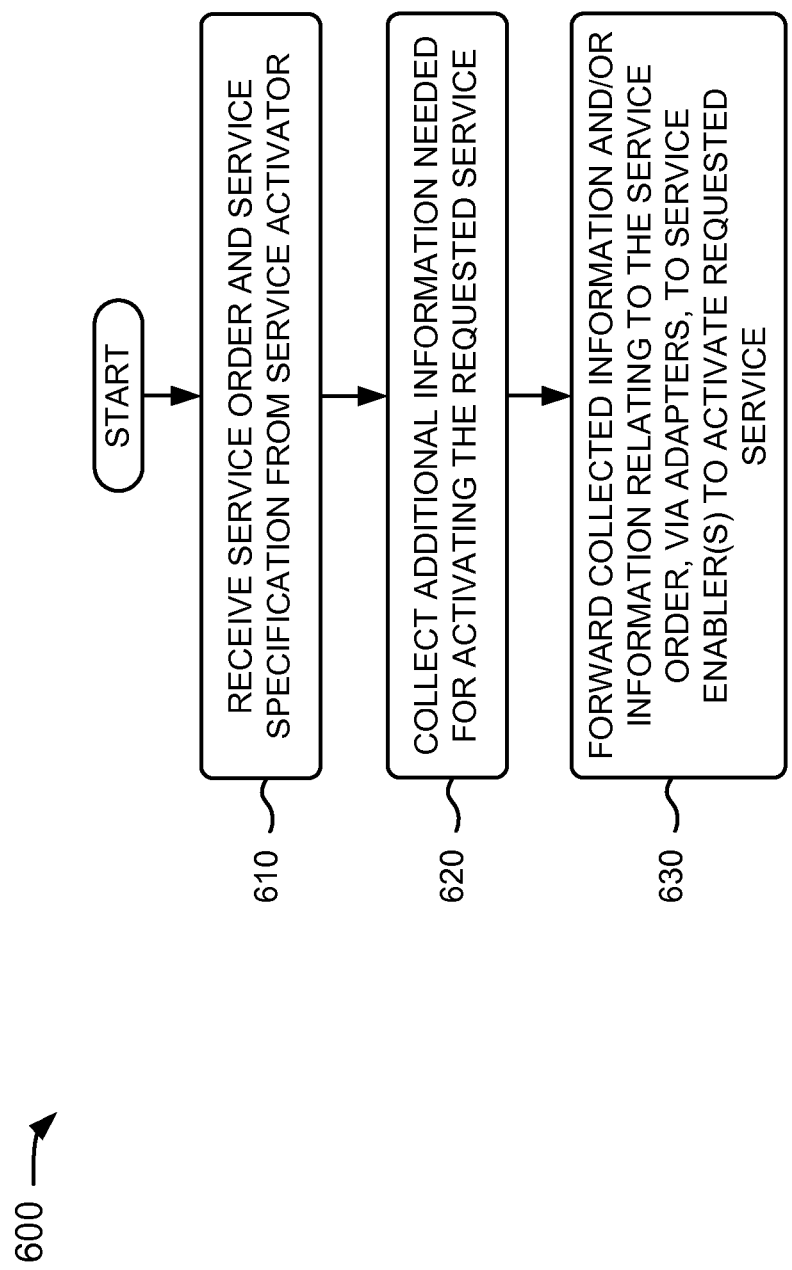

SYSTEM AND METHOD FOR A SERVICE PROVISIONING PLATFORM FOR ACTIVATING SERVICES IN A COMMUNICATION NETWORK

TECHNICAL FIELD

Embodiments described herein relate generally to communication systems, and more specifically, to techniques for provisioning services in communication systems.

BACKGROUND

Service providers may offer a variety of services to customers. For example, a customer may be provided with the option of obtaining a wired telephone-based service, a wireless telephone-based service, a data networking-based service (wired or wireless), a television-based service, etc. To obtain such a service from the service provider, the customer may submit an order for the desired service. Once submitted, the service may be activated prior to the customer being able to use the service.

A current service provisioning architecture includes a Customer Administration System (CAS), a provisioning gateway, and a group of service enablers. In operation, the CAS may provide information for a service order to the provisioning gateway, which acts to provide the appropriate information to the appropriate service enablers for activating the ordered service. One of the main problems with the current service provisioning architecture is that the architecture does not support reuse of existing information. As a result, the CAS (and/or its administrator) has to collect all information that will be required for provisioning a service before the provisioning even starts. Thus, the provisioning of a service can be greatly delayed until all of the information can be collected.

In addition, the current provisioning gateway provides an interface that is based on concrete data models, where there is a different data model for each service enabler. Thus, when a new service enabler is provided in the network, network administrators have to update the provisioning gateway to include a new data model for the new service enabler, and notify the existing activation processes, the existing interfaces, the existing clients (e.g., order systems/processes), the CAS, the administration system, etc. of the new service enabler. Thus, introduction of new components to the current service provisioning architecture is a big undertaking.

The current service provisioning architecture provides schemas that specify what activation/provisioning information a specific service needs. However, current provisioning interfaces, such as Service Provisioning Markup Language (SPML) and Customer Administration Interface 3rd Generation (CAI3G), are abstract eXtensible Markup Language (XML)-based interfaces. Thus, even though the provisioning interface may remain the same, usage of the provisioning interface may require that a client that operates on the provisioning interface has to be changed in order to handle a new schema. As a result, the provisioning interfaces may be changed (e.g., internal code may be updated to support new provisioning targets).

SUMMARY

It is an object of the invention to overcome at least some of the above disadvantages, and to provide a service provisioning platform that provides a single generic, concrete, and stable interface for provisioning services.

An embodiment described herein may provide a method that is performed by a device. The method may include receiving, using the device, a service order, the service order identifying a service to be provisioned; obtaining, using the device, information regarding the service; identifying, using the device, a service processing system to invoke for provisioning the service, the identifying being based on the obtained information regarding the service; and routing, using the device, the service order and the information regarding the service to the identified service processing system.

Another embodiment described herein may provide a system that includes a service activator, a service processing system, and an adapter. The service activator may receive a service order that identifies a service to be provisioned; obtain, using the service order, a specification for the service; identify, based on the specification, the service processing system to invoke for provisioning the service; and send the service order and the specification to the identified service processing system. The service processing system may receive the service order and the specification from the service activator; collect, in response to receiving the service order and the specification, information from one or more external sources; and forward information for provisioning the service to an adapter, the information being based on the collected information and the service order, and the specification. The adapter may receive the information for provisioning the service from the service processing system, convert the received information to an appropriate format, and transfer the converted information to one or more of a provisioning gateway or one or more service enablers for provisioning the service.

Systems and/or methods described herein provide a service provisioning platform that uses service-specific activation processes, which results in a single generic, concrete, and stable interface. The service provisioning platform provides support for activation/provisioning of any type of service. The service provisioning platform also provides support for multiple service activation state machines and activation processes at the same time. For example, data for multiple services may be simultaneously collected and multiple services may be simultaneously activated on service enablers. In addition, due to the concrete and predefined service types defined in the service provisioning platform, external clients, such as order systems/processes, do not need to be changed when new services are introduced.

BRIEF DESCRIPTION OF THE DRAWINGS

FIGS. 5 and 6 are flow charts of an exemplary process for activating a service according to an exemplary embodiment.

DETAILED DESCRIPTION

The following detailed description refers to the accompanying drawings. The same reference numbers in different drawings may identify the same or similar elements. Also, the following detailed description does not limit the invention.

Embodiments described herein may provide a service provisioning platform that provides a single, service-oriented interface for activating services in a communication system. The service provisioning platform may include a service activator that is independent of a service to be activated. In addition, the service provisioning platform may include service processing systems that may simultaneously collect the information that is needed for provisioning/activating a service.

A "service," as used herein, may refer to a data network-related service, a telephone-related service, and/or another type of service. A service may be visible to and directly usable by the customer (sometimes called a Customer Facing Service) or invisible to and/or not directly usable by the customer (sometimes called a Resource Facing Service). A particular service order may cause one or more Customer Facing Services to be activated and/or one or more Resource Facing Services to be used in order to activate the one or more Customer Facing Services. As a simple example, assume that the customer orders a Virtual Private Network (VPN) service. In addition, assume that the VPN service specification requires the use of a particular routing protocol. Thus, the service order for the VPN may cause activation of the VPN service and the required routing protocol service. In this example, the VPN service may be considered a Customer Facing Service and the routing protocol service may be considered a Resource Facing Service.

Figure 1:
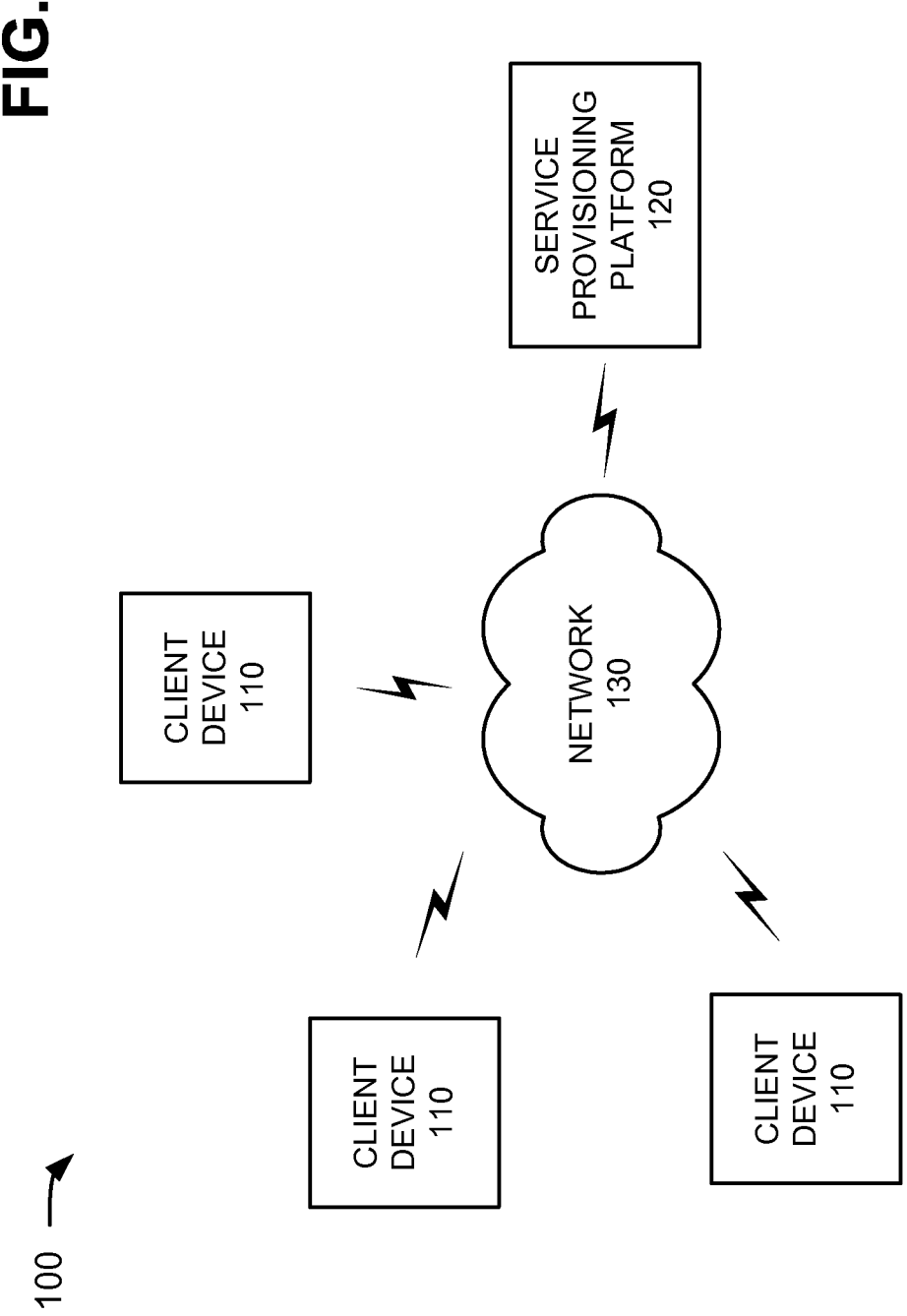
FIG. 1 is a diagram of an exemplary system in which systems and/or methods described herein may be implemented.

FIG. 1 is a diagram of an exemplary system 100 in which systems and/or methods described herein may be implemented. System 100 may include client devices 110 and a service provisioning platform 120 that connect via a network 130.

Client device 110 may include a device, such as a personal computer, a mainframe computer, a server, a lap top, a personal digital assistant (PDA), a telephone device, such as a wired or wireless telephone, etc. In one embodiment, client device 110 may correspond, for example, to a self-service portal, via which a customer may order a service, a Customer Administration System (CAS), via which a network operator or service provider administrator may order a service for a customer, a Business Support System (BSS), or another type of device or combination of devices. Client device 110 may connect to network 130 via any technique, such as wired or wireless connections.

Service provisioning platform 120 may include one or more devices that activate services in system 100. For example, service provisioning platform 120 may receive service orders from client devices 110 and cause the ordered or requested services, including any dependent services, to be activated. Service provisioning platform 120 may include one or more centrally located or distributed servers and/or other types of network devices. Service provisioning platform 120 may connect to network 130 via any technique, such as wired or wireless connections.

Network 130 may include one or more networks of any type, including a Public Land Mobile Network (PLMN), a telephone network (e.g., a Public Switched Telephone Network (PSTN) and/or a wireless network), a local area network (LAN), a metropolitan area network (MAN), a wide area network (WAN), an Internet Protocol Multimedia Subsystem (IMS) network, a private network, the Internet, an intranet, and/or another type of network.

Although FIG. 1 shows exemplary devices and networks of system 100, in other embodiments, system 100 may include fewer, different, differently arranged, or additional devices and/or networks than depicted in FIG. 1. Additionally, or alternatively, one or more devices of system 100 may perform one or more of the tasks described as being performed by one or more other devices of system 100.

Figure 2:
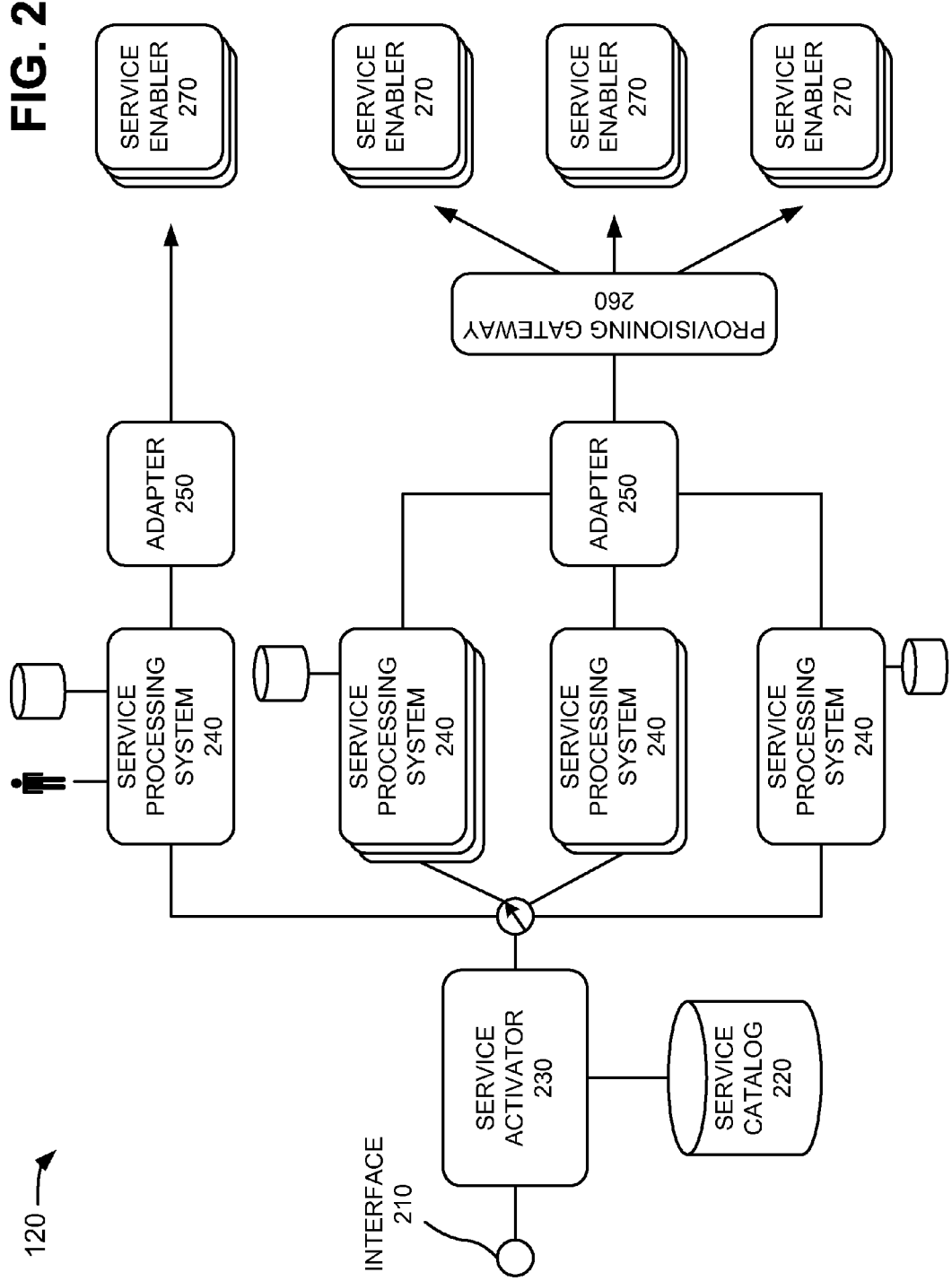
FIG. 2 is a diagram of exemplary components of the service provisioning platform of FIG. 1.

FIG. 2 is a diagram of exemplary components of service provisioning platform 120. As illustrated, service provisioning platform 120 may include an interface 210, a service catalog 220, a service activator 230, a group of service processing systems 240 (referred to collectively as "SPSs 240" or singly as "SPS 240"), a group of adapters 250, a provisioning gateway 260, and groups of service enablers 270.

Interface 210 may include one or more devices that act as an external view of service provisioning platform 120. For example, interface 210 may act as a specification or contract between the self-service portal, the CAS, and/or the BSS and service provisioning platform 120 (or, more particularly, service activator 230). Interface 210 may receive a service order from a client device 110. In one embodiment, the service order may include information associated with the service instance that belongs to the customer. The service order may also include references to the customer and/or service instance owner, and references to the service specification. In addition, the service order may include selected customer-specific characteristics/configurations.

Service catalog 220 may include one or more databases that store information fragments for services. The databases may be stored locally at service provisioning platform 120 or stored at one or more, possibly remote, locations in system 100. In one embodiment, the information fragments may be implemented according to the TeleManagement (TM) Forum Shared Information/Data Model (SID). The information fragments may include information specifying the characteristics of services, information identifying service dependencies, information identifying SPSs 240 to be invoked for activating the services, and/or other information that may be needed for activating services specified in service orders or other services (e.g., other Customer Facing Services and/or Resource Facing Services) dependent on the services specified in the service orders.

As an example, an information fragment, provided in service catalog 220, may include a Specification class, a ServiceSpecification class, a CustomerFacingServiceSpec class, a CustomerFacingServiceSpecAtomic class, a CustomerFacingServiceSpecComposite class, a ResourceFacingServiceSpec class, a ResourceFacingServiceSpecAtomic class, a ResourceFacingServiceSpecComposite class, a ServiceSpecCharacteristic class, a ServiceSpecCharacteristicValue class, a ServiceSpecCharRelationship class, a ServiceSpecCharValueRelationship class, a ServiceSpecCharUse class, a RootEntity class, a RootEntityType class, a CharacteristicSpecification class, a CharacteristicValue class, and/or a CharacteristicSpecValue class.

The Specification class may be an abstract type that contains common characteristics independent of a specification type. Information in the Specification class may not be visible in interface 210. However, the attributes of the Specification class may be visible via the inheriting types. The ServiceSpecification class may be an abstract type that is specialized for services. The ServiceSpecification may be the information holder for common information independent of type of service specification. Information in the ServiceSpecification class may not be visible in interface 210.

The CustomerFacingServiceSpec class may be an abstract type that is specialized for customer facing services. Information in the CustomerFacingServiceSpec class may not be visible in interface 210. However, the attributes of the CustomerFacingServiceSpec may be visible via the inheriting types. The CustomerFacingServiceSpecAtomic class may inherit attributes and associations from the Specification class, the ServiceSpecification class, and the CustomerFacingServiceSpec class. An instance of the CustomerFacingServiceSpecAtomic class may contain common information for a specific service independent of customers. The CustomerFacingServiceSpecAtomic class may also associate possible service characteristics and possible values, defining customer facing service specifications that do not depend on other customer facing service specifications. Information in the CustomerFacingServiceSpecAtomic class may be visible in interface 210. The CustomerFacingServiceSpecComposite class may be similar to the CustomerFacingServiceSpecAtomic class. However, the CustomerFacingServiceSpecComposite class may contain other CustomerFacingServiceSpecs (e.g., the CustomerFacingServiceSpecComposite class may contain both atomic and composite services).

The ResourceFacingServiceSpec class may be an abstract type that is specialized for resource facing services. Information in the ResourceFacingServiceSpec class may not be visible in interface 210. However, the attributes of the ResourceFacingServiceSpec may be visible via the inheriting types. The ResourceFacingServiceSpecAtomic class may inherit attributes and associations from the Specification class, the ServiceSpecification class, and the ResourceFacingServiceSpec class. An instance of the ResourceFacingServiceSpecAtomic class may contain common information for a specific service independent of customers. The ResourceFacingServiceSpecAtomic class may also associate possible service characteristics and possible values, defining resource facing service specifications that do not depend on other resource facing service specifications. Information in the ResourceFacingServiceSpecAtomic class may be visible in interface 210. The ResourceFacingServiceSpecComposite class may be similar to the ResourceFacingServiceSpecAtomic class. However, the ResourceFacingServiceSpecComposite class may contain other ResourceFacingServiceSpecs (e.g., the ResourceFacingServiceSpecComposite class may contain both atomic and composite services).

The ServiceSpecCharacteristic class may store information defining features (such as bandwidth) of the service specification. The ServiceSpecCharacteristicValue class may store information defining a set of attributes, each of which can be assigned to a corresponding set of attributes in a ServiceSpecCharacteristic object. The ServiceSpecCharRelationship class may store information defining relationships among service specification characteristics. The ServiceSpecCharValueRelationship class may store information defining relationships among service specification characteristic values. The ServiceSpecCharUse class may store information defining the use of the service specification characteristics defined in the ServiceSpecCharacteristics class.

The RootEntity class may be an abstract type for information common to the information fragment. Information from the RootEntity class may not be visible in interface 210. However, the attributes of the RootEntity class may be visible via the inheriting types. The RootEntityType class may be an information holder for the CharacteristicSpecification class (that holds a key for accessing the appropriate SPS 240).

The CharacteristicSpecification class may be the specification for a key for accessing the appropriate SPS 240. For example, the CharacteristicSpecification class may be a specification of a variable (e.g., a name, an identifier, etc.). The CharacteristicSpecValue class may store information identifying a number or text that can be assigned to a characteristic specification of the CharacteristicSpecification class. In one embodiment, the CharacteristicSpecValue class may store a value, for the key stored in the CharacteristicSpecification class, representing the type of SPS 240 to be activated. For example, the value type may represent a Universal Description Discovery and Integration (UDDI) Uniform Resource Indicator (URI) value type, a Java Naming and Directory Interface (JNDI) URI value type, or an endpoint Uniform Resource Locator (URL) value type. The CharacteristicValue class may store information defining a value for a characteristic defined by the CharacteristicSpecification class. In one embodiment, the CharacteristicValue class may store a value, corresponding to the value type specified in the CharacteristicSpecValue class, that is used to identify a location of the appropriate SPS(s) 240 to be used for the ordered service.

Service activator 230 may include one or more devices that process a service order to determine the appropriate SPS(s) 240 to invoke for activating the service or services needed for the service order. In one embodiment, service activator 230 may receive a service order, specifying a service to be activated. In response, service activator 230 may retrieve, using information identifying the service, a service specification for the service from service catalog 220. The service specification may describe the service, identified in the service order, describe additional services (if any) that will need to be activated for the ordered service, and describe how the ordered service and additional services will be activated. Based on the service specification, service activator 230 may determine an order in which the services are be activated and identify the particular SPS(s) 240 to be invoked for activating the services. Service activator 230 may pass the service order and the service specification to the particular SPS(s) 240.

SPSs 240 may include one or more devices that collect information for activating services. In one embodiment, SPSs 240 may be implemented based on the Business Process Execution Language (BPEL) and/or Enterprise JavaBeans (EJB). SPSs 240 may be service specification driven, meaning that each SPS 240 may collect additional information for activating a service, and may also wait for new information in order to fulfill the provisioning of the service. The collection of additional information may, for example, include information from one or more databases and/or one or more systems, information from one or more services that were performed either automatically or manually, and/or other types of information that may be needed to activate the service identified in the service order.

In one embodiment, an SPS 240 may be responsible for performing the final service provisioning and handling all potential states in which the service may enter. For example, one or more SPS(s) 240 may be implemented as a service activation state machine, such as the state machine defined in TMF518_SA_A, "Part 2: Service Activation Interface (SAI)," version 1.1, dated May 2008, which includes the following service activation states: a feasibility check state, a designed state, a reserved state, a provisioned inactive state, a provisioned active state, and a terminated state. In the feasibility check state, an SPS 240 may determine whether a service can be fulfilled and when the service can be activated. In the designed state, an SPS 240 may create one or more service orders for additional services (e.g., resource facing services needed for activating the service specified in the service order). In the reserved state, an SPS 240 may reserve a service for activation at a particular date and time, and reserve resources for the service. In the provisioned inactive state, an SPS 240 may cause a service to become active, but not available to a requesting customer. In the provisioned active state, an SPS 240 may cause a service to become available for use by a customer. In the terminated state, an SPS 240 may cause a service to be deactivated and may deallocate other services (e.g., resource facing services) from the service. In some instances, different SPSs 240 may support different service states. For example, each SPS 240 may support a different one of the above service activation states.

Adapters 250 may include one or more devices that may condition information from SPSs 240 for communication with other systems, such as provisioning gateway 260, service enablers 270, data sources from which SPSs 240 may need to collect data, and/or other systems. In one embodiment, an adapter 250 may include a frontend and a backend. The frontend may be responsible for data model transformations, such as performing information type translation, which may include both type translation and name mapping (entity and attribute). For example, if an ordered service needs a specific value translation, the frontend of adapter 250 may perform this function. In one embodiment, the frontend may be implemented, for example, as Stateless EJB and/or Extensible Stylesheet Language Transformation (XSLT). The backend may be responsible for technology translations (e.g., translating from a Java format to a Telnet-based communication). In one embodiment, the backend may be implemented, for example, as a Java Platform, Enterprise Edition (J2EE or JEE) Resource Adapter, based on the Java Connector Architecture (JCA).

Provisioning gateway 260 may include one or more devices that receive data for activating a service from an adapter 250, determine one or more service enablers (e.g., one or more of service enablers 270), and transmit the data to the appropriate service enablers. Service enablers 270 may include one or more devices that enable services based on data received from provisioning gateway 260 and/or adapters 250. For example, assume that, to enable a service for a customer, a user identifier and password need to be configured on a server. An adaptor 250 may receive the user identifier and password from an SPS 240, format the user identifier and password into a format used by the particular service enabler that will enable the user identifier and password, and send that formatted data to the particular service enabler. The particular service enabler may receive the formatted data and configure the server with the user identifier and password.

Although FIG. 2 shows exemplary components of service provisioning platform 120, in other embodiments, service provisioning platform 120 may include fewer, different, differently arranged, or additional components than depicted in FIG. 2. In still other embodiments, one or more components of service provisioning platform 120 may perform the tasks described as being performed by one or more other components of service provisioning platform 120.

Figure 3:
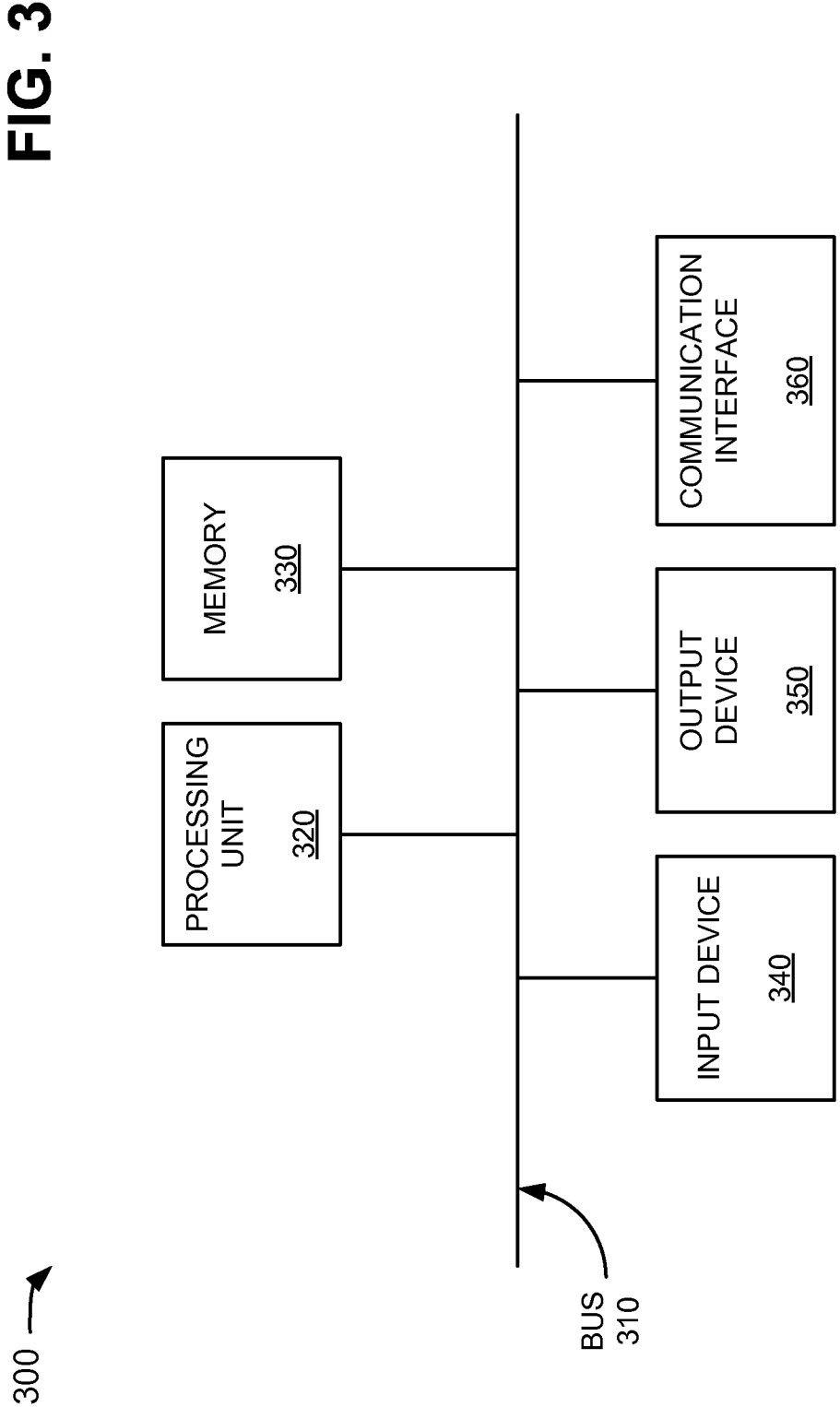
FIG. 3 is a diagram of exemplary components of an entity that may correspond to one of the components of the service provisioning platform of FIG. 2.

FIG. 3 is a diagram of exemplary components of an entity 300 that may correspond to one or more of interface 210, service activator 230, an SPS 240, an adaptor 250, a provisioning gateway 260, or a service enabler 270. As illustrated, entity 300 may include a bus 310, a processing unit 320, a memory 330, an input device 340, an output device 350, and a communication interface 360.

Bus 310 may permit communication among the components of entity 300. Processing unit 320 may include one or more processors and/or microprocessors that interpret and execute instructions. In some embodiments, processing unit 320 may be implemented as or include an application specific integrated circuit (ASIC), a field programmable gate array (FPGA), or the like. Memory 330 may include a random access memory (RAM) or another type of dynamic storage device that stores information and instructions for execution by processing unit 320, a read only memory (ROM) device and/or another type of static storage device that stores static information and instructions for the processing unit 320, a magnetic or optical recording medium and its corresponding drive for storing information and/or instructions, and/or other types of memory.

Input device 330 may include a device that permits an operator to input information to entity 300, such as a keyboard, a keypad, a mouse, a pen, a microphone, one or more biometric mechanisms, and the like. Output device 340 may include a device that outputs information to the operator, including a display, a printer, a speaker, etc.

Communication interface 360 may include any transceiver-like mechanism that enables entity 300 to communicate with other devices and/or systems. For example, communication interface 300 may include mechanisms for communicating with another device or system via a network, such as network 130.

As will be described in detail below, entity 300 may perform certain operations relating to provisioning a service. Entity 300 may perform these and other operations in response to processing unit 320 executing software instructions contained in a computer-readable medium, such as memory 330. A computer-readable medium may be defined as one or more physical and/or logical memory devices. A logical memory device may include a space within a single physical memory device or spread across multiple physical memory devices. The software instructions may be read into memory 330 from another computer-readable medium or from another device via communication interface 360. The software instructions contained in memory 330 may cause processing unit 320 to perform processes that will be described later. Alternatively, hardwired circuitry may be used in place of or in combination with software instructions to implement processes described herein. Thus, systems and methods described herein are not limited to any specific combination of hardware circuitry and software.

Although FIG. 3 shows exemplary components of entity 300, in other embodiments, entity 300 may include fewer, different, differently arranged, or additional components than depicted in FIG. 3. In some embodiments, one or more components of entity 300 may perform the tasks described as being performed by one or more other components of entity 300.

Figure 4:
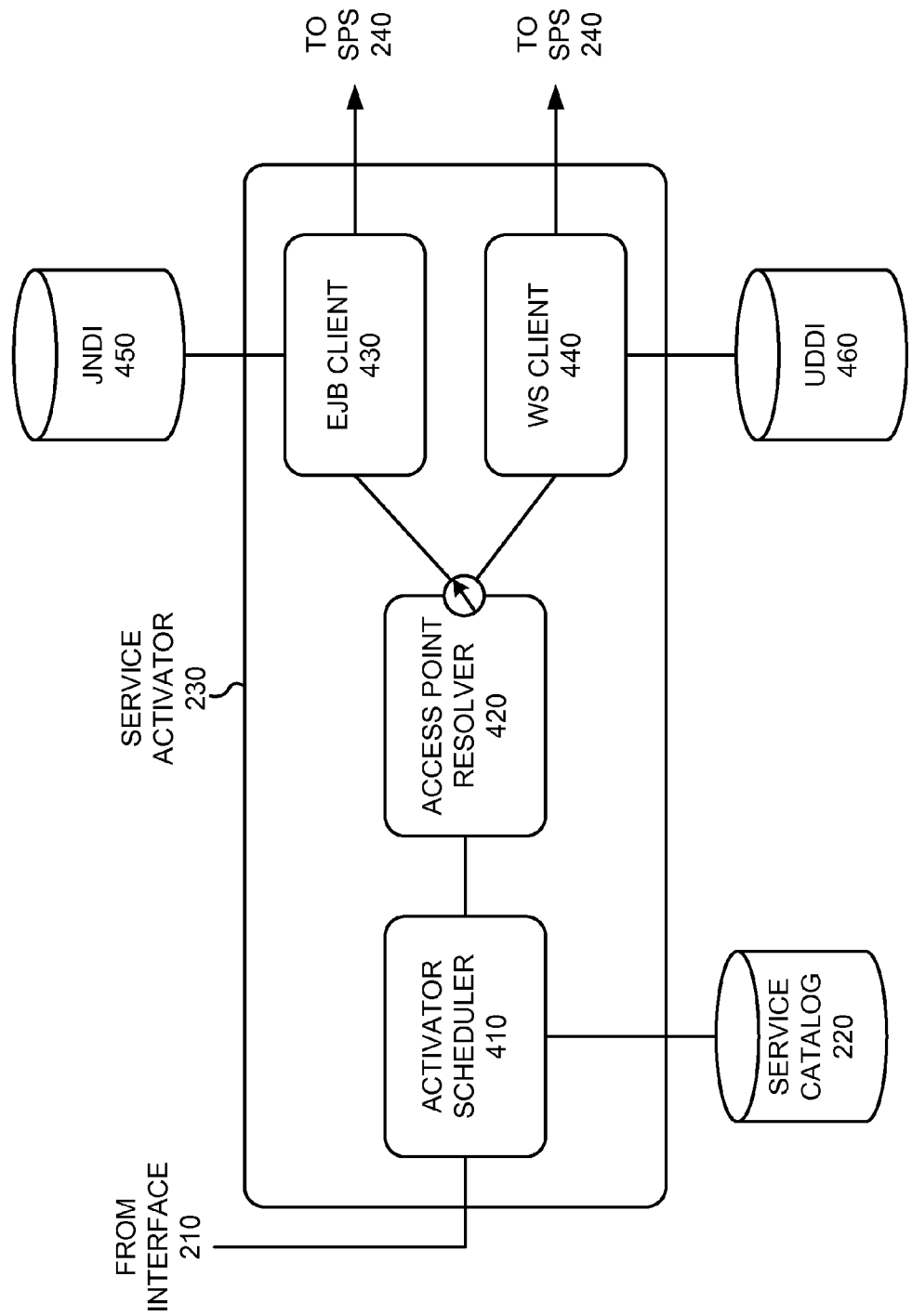
FIG. 4 is a diagram of exemplary functional components of the service activator of FIG. 2.

FIG. 4 is a diagram of exemplary functional components of service activator 230. As illustrated, service activator 230 may include an activator scheduler 410, an access point resolver 420, and a group of SPS clients (illustrated as an EJB client 430 and a web service (WS) client 440). Activator scheduler 410, access point resolver 420, EJB client 430, and WS client 440 may be implemented via a single device (e.g., a single server) or via one or more different devices (e.g., different servers). In one embodiment, the functions described in connection with FIG. 4 may be performed by one or more of the components depicted in FIG. 3.

Activator scheduler 410 may include one or more components that receive and process service orders. For example, in one embodiment, activator scheduler 410 may receive a service order that identifies a service. Activator scheduler 410 may, using information identifying the service, retrieve a service specification for the service from service catalog 220. As indicated above, the service specification may describe the identified service (e.g., characteristics of the service, values of the characteristics, etc.), describe additional services (if any) that will need to be activated for the ordered service, and describe how the ordered service and additional services will be activated. Based on the service specification, activator scheduler 410 may determine an order in which the services are be activated. Activator scheduler 410 may pass the service order and the service specification to access point resolver 420.

Access point resolver 420 may include one or more components that receive the service order and the service specification, from activator scheduler 410, and process the received information to determine the SPS naming service lookup client(s) to use for identifying the appropriate SPS(s) 240 to invoke for activating the service and any other services (e.g., resource facing services) needed for activating the service. In one embodiment, access point resolver 420 may identify the SPS clients to use in the order in which the services are to be activated, as determined by activator scheduler 410. For example, assume that a service order specifies a customer facing service, that the service specification for the customer facing service indicates that a resource facing service is needed to activate the customer facing service, and that activator scheduler 410 determines that the resource facing service is to be used before the customer facing service is activated. In this example, access point resolver 420 may determine an SPS client for the resource facing service before determining an SPS client for the customer facing service. Alternatively, access point resolver 420 may determine the SPS clients for the resource facing service and the customer facing service substantially simultaneously.

Access point resolver 420 may determine the appropriate SPS client to use for a service based on information in the service specification. For example, in one embodiment, access point resolver 420 may determine the appropriate SPS client based on value type in the CharacteristicSpecValue class of the service specification, retrieved from service catalog 220.

The SPS clients may include one or more components that identify the appropriate SPS(s) 240 to invoke for services and may forward the service order and the service specification to the identified SPS(s) 240. In one embodiment, the SPS clients may include EJB client 430 and WS client 440. EJB client 430 may include one or more components that perform a lookup in a JNDI database 450. For example, EJB client 430 may receive a JNDI name (e.g., specified in the CharacteristicValue associated with the CharacteristicSpecValue class of the service specification) and use this JNDI name to perform a lookup in JNDI database 450 to find location information (e.g., an object reference (address)) for the appropriate SPS 240 to be invoked for the service. WS client 440 may include one or more components that perform a lookup in a UDDI database 460. For example, WS client 440 may receive a UDDI URI (e.g., specified in the CharacteristicValue associated with the CharacteristicSpecValue class of the service specification) and use this UDDI URI to perform a lookup in UDDI database 460 to find location information (e.g., an endpoint URL) for the appropriate SPS 240 to be invoked for the service. In some situations, the CharacteristicValue associated with the CharacteristicSpecValue class of the service specification may store an endpoint URL. In this situation, no database lookup may be needed. Instead, access point resolver 420 may use WS client 440 to transmit information for activating the appropriate service to the appropriate SPS 240 associated with the endpoint URL point. In some embodiments, EJB client 430 and WS client 440 may operate in parallel.

The functional components illustrated in FIG. 4 are exemplary. In practice, service activator 230 may include fewer, different, differently arranged, or additional functional components than illustrated in FIG. 4. In some embodiments, one or more functional components of service activator 240 may perform one or more of the tasks described as being performed by one or more other functional components of service activator 240.

FIG. 5 is a flow chart of an exemplary process 500 for activating a service according to an exemplary embodiment. In one embodiment, process 500 may be performed by service activator 230. In other embodiments, some or all of process 500 may be performed by another component or a combination of components, including or excluding service activator 230, of service provisioning platform 120.

As illustrated in FIG. 5, process 500 may include receiving a service order (block 510). Service activator 230 (e.g., activator scheduler 410) may receive a service order from, for example, a self-service portal, a CAS or other BSS, etc. The service order may identify, among other things, a customer facing service that is to be activated.

Process 500 may further include obtaining a service specification applicable to the service identified in the service order (block 520). For example, service activator 230 (e.g., activator scheduler 410) may use information identifying the customer facing service identified in the service order to obtain a service specification for the service from service catalog 220. As indicated above, the service specification may define characteristics and values for the customer facing service and may identify other services (e.g., one or more other customer facing services and/or one or more resource facing services) that are needed for activating the customer facing service identified in the service order. In addition, the service specification may define how the service and other services are to be activated.

Process 500 may additionally include identifying service(s) to be activated based on the service specification (block 530). For example, service activator 230 (e.g., activator scheduler 410) may use information from the service specification to identify other services (e.g., one or more other customer facing services and/or one or more resource facing services) that are needed for activating the customer facing service identified in the service order. Service activator 230 (e.g., activator scheduler 410) may identify resource facing services (if any) that are needed for activating the customer facing service identified in the service order from, for example, the ResourceFacingServiceSpecComposite class of the service specification. Service activator 230 (e.g., activator scheduler 410) may identify other customer facing services (if any) that are needed for activating the customer facing service identified in the service order from, for example, the CustomerFacingServiceSpecComposite class of the service specification. For explanatory purposes, assume that the service specification indicates that a resource facing service is needed for activating the customer facing service.

Process 500 may include identifying an order in which service(s) are to be activated based on the service specification (block 530). For example, service activator 230 (e.g., activator scheduler 410) may use information from the service specification to identify the order in which the customer facing service, identified in the service order, and other services are to be activated. Service activator 230 (e.g., activator scheduler 410) may identify the order based, for example, on the dependency information specified in the ResourceFacingServiceSpecComposite class of the service specification. For explanatory purposes, assume that the service specification specifies that the resource facing service is to be activated before the customer facing service.

Process 500 may further include identifying an SPS naming service lookup to perform for the identified service(s) based on the service specification (block 540). For example, service activator 230 (e.g., access point resolver 420) may use information from the service specification to identify the type of lookup to perform for the service(s). Service activator 230 (e.g., access point resolver 420) may identify the type of lookup to perform for each service based, for example, on information specified in the value type in the CharacteristicSpecValue class of the service specification. For explanatory purposes, assume that the service specification indicates that the resource facing service requires a JNDI lookup and that the customer facing service requires a UDDI lookup.

Process 500 may still further include performing an SPS naming service lookup, based on the service specification, to determine location(s) of SPS(s) 240 to be invoked for the service(s) (block 550). For example, service activator 230 (e.g., access point resolver 420) may cause EJB client 430 to lookup a location of an SPS 240 (e.g., in JNDI database 450) to be invoked for the resource facing service. In addition, service activator 230 (e.g., access point resolver 420) may cause WS client 440 to lookup a location of an SPS 240 (e.g., in UDDI database 460) to be invoked for the customer facing service.

Process 500 may include routing the service order and the service specification to the SPS(s) in the appropriate order (block 560). For example, service activator 230 (e.g., one of EJB client 430 or WS client 440) may transfer the service order and the service specification to the appropriate SPS 240, based on the determined location of SPS 240. In the example above, EJB client 430 may transfer the service order and the service specification to an SPS 240, based on the location obtained from JNDI database 450. In addition, at some time instance (e.g., when service activator 230 receives an indication that the resource facing service has been activated), WS client 440 may transfer the service order and the service specification to an SPS 240, based on the location obtained from UDDI database 460. EJB client 430 and WS client 440 may provide the information to the appropriate SPS 240 in the order determined by service activator 410. For example, in the example above, EJB client 430 may transfer the service order and the service specification to SPS 240 (identified from JNDI database 450) before WS 440 transfers the service order and the service specification to SPS 240 (identified from UDDI database 460). In some embodiments, EJB client 430 and WS 440 may transfer the service order and the service specification in another order, such as in parallel.

FIG. 6 is a flow chart of an exemplary process 600 for activating a service according to an exemplary embodiment. In one embodiment, process 600 may be performed by an SPS 240. In other embodiments, some or all of process 600 may be performed by another component or a combination of components, including or excluding an SPS 240, of service provisioning platform 120.

As illustrated in FIG. 6, process 600 may include receiving a service order and a service specification from service activator 230 (block 610). For example, SPS 240 may receive the service order and the service specification from one of EJB client 430 or WS client 440. For explanatory purposes, assume that a customer has ordered a broadband data service and that service activator 230 passes the service order and the service specification (for the broadband data service) to SPS 240.

Process 600 may further include collecting additional information needed for activating the service (block 620). For example, SPS 240 may use information from the service order and/or the service specification to obtain additional information for activating the service. The additional information may include information obtained from one or more databases and/or systems, information obtained that has been manually collected and provided to SPS 240, and/or other information. As an example, assume that, to activate the broadband data service, SPS 240 is to reserve physical resources in network 130. In addition, assume that this reservation of physically resources failed due, for example, to the customer living in a residual area that has not been set up to support the broadband data service. As a result, SPS 240 may generate a new service order. This new service order may include manual services (e.g., a service technician may need to perform one or more manual patches and upgrades at a cabinet that serves the customer's neighborhood). SPS 240 may be notified once the new service order has been satisfied. SPS 240 may then attempt, for a second time, to reserve the physical resources that are needed to provide the broadband data service. SPS 240 may continue generating new service orders for any other required services until the physical resources are able to be reserved.

Further, assume that SPS 240 is to add the customer's information (e.g., an identifier and password) to the servers that provide the broadband data service. In addition, assume that the password was previously generated as part of processing the service order for the broadband data service. Thus, SPS 240 may collect the generated password from the system that generated the password.

Process 600 may additionally include forwarding the collected information and/or information relating to the service order, via adapters, to service enabler(s) to activate the requested service (block 630). For example, SPS 240 may forward the collected information, information relating to the service order (e.g., data and/or parameters), and/or information related to the service specification to a service enabler 270, via an adapter 250 and/or provisioning gateway 260. As an example, assume that the generated password is received in a Web Service message and that the service enabler, to which the generated password is to be passed, has a REpresentational State Transfer (REST) interface. Adapter 250 may transform the web service message to a REST-based message, and transmit the transformed REST-based message to the service enabler. In this way, SPS 240 may, in the process of activating a service, invoke (e.g., via adaptors 250) several different service enablers 270, other systems, and possibly human interactions.

Systems and/or methods described herein provide a service provisioning platform that uses service-specific activation processes, which results in a single generic, concrete, and stable interface. The service provisioning platform provides support for activation/provisioning of any type of service. The service provisioning platform also provides support for multiple service activation state machines and activation processes at the same time. For example, multiple services may be simultaneously activated on service enablers. In addition, due to the concrete and predefined service types defined in the service provisioning platform, external clients, such as order systems/processes, do not need to be changed when new services are introduced.

The foregoing description of embodiments provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 5 and 6, the order of the blocks may be modified in other embodiments. Further, non-dependent blocks may be performed in parallel.

It should be emphasized that the term "comprises/comprising" when used in this specification is taken to specify the presence of stated features, integers, steps or components but does not preclude the presence or addition of one or more other features, integers, steps, components or groups thereof.

It will be apparent that exemplary aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, performed by a device in a service provisioning platform for activating services in a communications network, the method comprising:
   receiving, using the device, a service order, the service order identifying a current service to be provisioned;
   obtaining, using the device, information regarding the current service;
   identifying, using the device, a service processing system to invoke for provisioning the current service, the identifying being based on the obtained information regarding the current service;
   identifying, using the device, one or more additional services, using the information regarding the current service;
   determining, using the device a sequence in which the current service and the one or more additional services are to be activated; and
   sending the service order, the information regarding the current service, and the sequence in which the current service and the one or more additional services are to be activated, from the device to the identified service processing system and from the device toward a service enabler such that the service enabler collects the information regarding the current service, determines a sequence for activating the current service and the one or more additional services based on the sequence determined by the device, and activates the current service and the one or more additional services based on the determined sequence for activating the current service and the one or more additional services.

2. The method of claim 1, where the obtaining the information regarding the service includes:
   obtaining a service specification, for the current service, from a service catalog that maintains service specifications for a plurality of services.

3. The method of claim 1, where the identifying the one or more additional services includes:
   identifying another service processing system to be invoked for each service of the one or more additional services.

4. The method of claim 1, further comprising:
   determining a location of the service processing system to be invoked for the current service to be provisioned, and where the sending includes:
   sending the service order, the information regarding the current service, and the sequence in which the current service and the one or more additional services are to be activated, from the device to the determined location.

5. The method of claim 4, where the determining the location of the service processing system includes:
   looking up the location of the service processing system using a naming service lookup client.

6. The method of claim 5, where the looking up the location includes:
   using the naming service client to access one of a Java Naming and Directory Interface (JNDI) database or a Universal Description, Discovery and Integration (UDDI) database.

7. The method of claim 4 wherein the determined location comprises an object reference.

8. The method of claim 4 wherein the determined location comprises an endpoint URL.

9. A service provisioning platform for activating services in a communications network, the service provisioning platform comprising:
   a device to:
   receive a service order that identifies a current service to be provisioned,
   obtain, using the service order, a specification for the current service,
   identify, based on the specification, a service processing system to invoke for provisioning the current service,
   identify, using the specification for the current service, one or more additional services to be provisioned,
   determine a sequence in which the current service and the one or more additional services are to be activated,
   invoke the service processing system by sending the service order, the specification, and the sequence in which the current service and the one or more additional services are to be activated, from the device to the identified service processing system,
   forward at least one of the service order and the sequence in which the current service and the one or more additional services are to be activated, toward a service enabler, for activating the current service that was ordered, the service enabler to:
   collect information related to the at least one of the service order and the sequence in which the current service and the one or more additional services are to be activated;
   determine a sequence for activating the current service and the one or more additional services, based on the information; and
   activate the current service and the one or more additional services based on the determined sequence.

10. The service provisioning platform of claim 9, where, when obtaining the specification for the service, the device is to:
    obtain the specification from a service catalog that stores service specifications for a plurality of services capable of being provisioned in the system.

11. The service provisioning platform of claim 9, where, when identifying the one or more additional services, the device is to:
    identify another service processing system to be invoked for each service of the one or more additional services, and identify a sequence in which each identified service processing system is to be invoked.

12. The service provisioning platform of claim 9, where the device is further to:
   determine a location of the service processing system to be invoked for the current service to be provisioned, and where,
   when invoking the service processing system, the device is to:
      send the service order, the specification, and the sequence in which the current service and the one or more additional services are to be activated, to the determined location.

13. The service provisioning platform of claim 12, where when determining the location of the service processing system, the device is to:
   perform a database lookup, for the location, using information identifying the service processing system.

14. The service provisioning platform of claim 9, where the service processing system is further configured to:
   receive the service order, the specification, and the sequence in which the current service and the one or more additional services are to be activated, from the device,
   collect additional information relating to the current service, and
   forward at least one of the collected additional information or data related to the service order, and the sequence in which the current service and the one or more additional services are to be activated, toward a service enabler, for activating the current service that was ordered.

15. A service provisioning platform for activating services in a communications network comprising:
   a service activator to:
   receive a service order that identifies a current service to be provisioned,
   obtain, using the service order, a specification for the current service,
   determine, using the specification for the current service, relative service sequencing information for the current service relative to the one or more additional services to be activated,
   identify, based on the specification, a service processing system to invoke for provisioning the current service, and
   send the service order, the specification, and the relative service sequencing information to the identified service processing system;
   the service processing system, including one or more processors coupled to at least one memory, configured to:
   receive the service order, the specification, and the relative service sequencing information from the service activator,
   collect, in response to receiving the service order and the specification, information from one or more external sources, and
   forward information for provisioning the service and the relative service sequencing information to an adaptor, the information being based on the collected information and the service order; and
   the adaptor, including one or more processors coupled to at least one memory, configured to:
   receive the information for provisioning the service and the relative service sequencing information from the service processing system,
   convert the received information and the relative service sequencing information to an appropriate format for use by one or more provisioning gateways or by a service enabler for activating the service, and
   transfer the converted information to one or more of a provisioning gateway for provisioning the service for activation of the service or one or more service enablers for activating the service;
   the service enabler, including one or more processors coupled to at least one memory, configured to:
   collect the converted information for provisioning the current service and the one or more additional services,
   determine a sequence for activating the current service and the one or more additional services, based on the relative sequencing information, and
   activate the current service and the one or more additional services based on the determined sequence;
   at least one processor; and
   at least one memory coupled to the at least one processor and comprising computer readable program instructions embodied therein that, when executed by the at least one processor, causes the at least one processor to perform the operations of the service activator, the service processing system, the adaptor, or the service enabler.

16. The service provisioning platform of claim 15, where, when obtaining the specification for the service, the service activator is to:
   obtain the specification from a service catalog that stores service specifications for a plurality of services capable of being provisioned in the system.

* * * * *